United States Patent

[11] 3,583,206

| [72] | Inventors | Hector Rolando Espinal<br>Cuyahoga Falls;<br>Joseph Raymond Weber, Canal Fulton,<br>both of, Ohio |
|---|---|---|
| [21] | Appl. No. | 766,391 |
| [22] | Filed | Oct. 10, 1968 |
| [45] | Patented | June 8, 1971 |
| [73] | Assignee | The General Tire & Rubber Company |

[54] CURE CYCLE OPTIMIZATION
2 Claims, 12 Drawing Figs.

[52] U.S. Cl. .................................................... 73/15.6
[51] Int. Cl. ....................................................... G01n 1/00
[50] Field of Search ......................................... 73/15, 15.9, 15.6

[56] References Cited
UNITED STATES PATENTS

| 2,222,470 | 11/1940 | Barnes........................... | 73/15.6 |
| 3,039,297 | 6/1962 | Peter et al..................... | 73/15.6 |
| 3,182,494 | 5/1965 | Beatty et al.................... | 73/15.6 |

OTHER REFERENCES

Andrews R. D. Retraction of Oriental Polystyrene Monofilaments. "Journal of Applied Physics" Vol. 26, No. 9 Sept. 1955 available 73/15.6

*Primary Examiner*—Richard C. Queisser
*Assistant Examiner*—John K. Lunsford
*Attorneys*—Frank C. Rote, Jr. and Harry F. Pepper, Jr.

ABSTRACT: Disclosed is a method of relating realistic states of cures and accurate indications of physical property development to the temperature and time variables present through out the cure cycle of a vulcanizate. The method can optimize curing processes in general which depend, in fact, upon the interrelation of the variables time, temperature, per cent cure and physical properties. By utilizing the method hereafter disclosed, existing cures may be examined to see if time savings can be made on the curing press at no loss in the physical properties desired. Compound cure rates may be established depending upon existing time-temperature relationships. Existing cures may be examined to see, in fact, what relationships exist and if overcure or undercure has or will occur.

TIME-TORQUE-TEMPERATURE-% CONVERSION
COMPOUND XC

INVENTOR
HECTOR R. ESPINAL
JOSEPH R. WEBER

BY Harry F. Pepper, Jr.

ATTORNEY

CURE CYCLE OPTIMIZATION

BACKGROUND OF THE INVENTION

The invention relates to optimizing curing cycles of vulcanizable compounds.

The standard method for converting rubber into a commercially usable product which will resist heat and cold, in addition to having considerable mechanical strength, is called vulcanization or cure. The curing, or vulcanization process, consists of adding sulfur or other vulcanizing agents to rubber and subjecting the mixture to heat for some period of time. The basic concept of vulcanization has remained essentially static since its inception. The technological processes, the materials used, and the required demands on the finished product have increased greatly during the past century or so since the discovery of vulcanization.

Generally, vulcanization is the tying together of two or more single chains along the already entangled morphology of an elastomer, to yield a complex network, as contrasted with a system of single strands. These chains are tied together at fix points or crosslinks. These fixed points are added in an amount so that even when the material is subjected to a sustained stress, it is still able to snap back to its original form. Unvulcanized rubber then, is a random arrangement of polymer chains which when deformed will not return to its original shape, while vulcanized rubber can be deformed, but because of crosslinks it will return to its original shape when the cause of deformation is removed.

One of the problems confronting industry since the discovery of vulcanization is how to determine when the optimum level of crosslinking has been achieved in relation to amount of curatives present, the heat input supplied, and the desired end point properties of the material. The measurement of crosslink density is assumed to be related to various mechanical and chemical-type tests that are called "physical property data". Some of the more common physical property tests are as follows:

OPTIMUM CURE TESTS

Most common:
   Modulus
   Tensile and elongation
   Hardness
   Percent sulfur

Service dependent
   Tear-strength.
   Flex-cracking.
   Abrasion.
   Cut-growth, permanent set.

Determining crosslink density or percent cure from physical property data is by no means exact and is a subject which can be influenced to a great deal by personal judgment and intuition.

A typical approach would be to prepare a sample for physical property testing by curing it at one temperature for selected time intervals. Physical property measurements are made at each of the selected time intervals. The curing temperature may be a value in the range of 250° F. to 320° F. A plot of the variation of a particular physical property with time is then obtained.

Taking three typical physical properties such as 300 percent modulus, hardness and tensile strength at a 280° F., the points of optimum cure are picked out on each of the three physical property plots, with time as the abscissa, by a. Tensile Strength — The point on the curve which has a tangent based on a slope of 10 pounds increase in tensile strength per minute of cure b. Modulus — A point on the curve which has a tangent based on a slope of 20 pounds increase in modulus per minute of cure.

c. Hardness — A point on the curve which has a tangent based on a slope of 20 percent increase per minute of cure.

These points are purely arbitrary and subject to change depending upon the company. Actually, a fairly decent approximation of the optimum cure time may be arrived at using the old-fashioned eyeball method. The optimum cure then for such a stock might be determined to be 45 minutes at 280° F.

Complicating the estimate of the prediction of optimum cure is the fact that rubber physical properties are subject to considerable inherent error because of curative ingredients dispersion, as well as routine test error. However, physical property relationships are always shown as plotted through exact points, where in reality they should be plotted as bands or belts to allow for error and statistical variation. This implies that in obtaining these values one should always use random and multiple sampling.

Having, more or less, determined the time needed to cure a particular compound at one particular temperature (45 minutes at 280° F.), the next step is to complete the temperature versus time-to-cure relationship for all temperatures and all times. The manner in which this is traditionally done is by referring to an old chemistry axiom which states:

"For each 10° C. rise in temperature, the rate increases by a fixed factor or temperature coefficient of 2. If the units of temperature are °F., then the rate increases by a factor of 1.5 for each 10° F. rise." Forty-five minutes of cure at 280° F. then are theoretically equivalent to 22.5 minutes of cure at 298° F. and 90 minutes of cure at 262° F. if a temperature coefficient of 2.0 is used for each 10° C. or 18° F. increase or decrease in temperature. The relationship is exponential and the next step would be to derive a cure conversion chart using semilog paper. Graphs of this type can be found in most books dealing with vulcanization.

Similarly, another approach might be to derive a table and to introduce the concept of equivalent minutes. To an arbitrary temperature of 280° F., a cure factor value of 1.000 would be assigned and knowing the reaction rate doubles for each 10° C. or 18° F. rise in temperature, then a temperature of 298° F. would have a cure factor value of 2.000. When this factor is multiplied by the actual minutes, equivalent minutes of cure are obtained. A typical cure factor conversion table might be set up as follows:

|   | 260 | 270 | 280 | 290 |
|---|---|---|---|---|
| 0 |   |   | 1.000 |   |
| 1 |   |   |   |   |
| 2 |   | 0.500 |   |   |
| 3 |   |   |   |   |
| 4 |   |   |   |   |
| 5 |   |   |   |   |
| 6 |   |   |   |   |
| 7 |   |   |   |   |
| 8 |   |   |   | 2.000 |
| 9 |   |   |   |   |

Again, the practice varies within the industry. Some may use a factor of 2.2 to 1.8 or may use a temperature increment of 8° C. or 12° C. All these methods are primarily based on the axiom, stated previously, and are, at best, approximations.

To use the Cure Factor Conversion Table we define equivalent minutes as follows:

Equivalent Minutes = Cure Factor × Actual Minutes

Thus, cure is defined in terms of so many equivalent minutes. Using the previous optimum relation of 45 minutes at 280° F., the cure for that particular sample is 45 × 1.000 = 45 equivalent minutes. For the same sample, at 298° F., 22.5 actual minutes of cure, equivalent minutes of cure would be 22.5 × 2.00 = 45. Similarly, for any temperature and actual time, equivalent minutes may be obtained, which are additive. When this value becomes 45 for the particular compound, the stock is "cured."

In practical vulcanization, it is necessary to have cure conversion charts of this type because we deal with varying thicknesses of rubber, differential heat flows and driving temperatures, and varying compound cure rates. Therefore, supposing we have a piece of rubber which was subject to the following temperatures and requires 45 minutes at 280° F. to achieve optimum cure, the question is when has enough heat been put into the rubber to achieve optimum cure?

Given: 10 minutes at 262° F.

10 minutes at 280° F.

10 minutes at 298° F.

The cure factors at these temperatures are:

| Temperature, ° F.: | Cure factor | × | Actual minutes | = | Equivalent minutes |
|---|---|---|---|---|---|
| 262 | 0.500 | | 10 | | 5 |
| 280 | 1.000 | | 10 | | 10 |
| 298 | 2.00 | | 10 | | 20 |
| Total | | | | | 35 |

Fourty-five equivalent minutes are required but the stock has undergone only 35 equivalent minutes. Therefore, we might infer that the piece of rubber is undercured. To determine what percent of cure is present, one approximation might be the ration 35/45 or 78 percent. However, this is not necessarily true as it assumes linearity between percent cure and time. Regardless of the system used to determine the equivalent minutes of cure, the axiom concerning reaction rates doubling for each 10° C. rise is believed by many to be true.

Recent studies made of this traditional approach have led some to the conclusion that this doubling effect is true only at a particular temperature over a very limited range. Each reaction, of course, is defined by its own characteristic activation energy. Another way of looking at this is, as the stock moves towards higher temperatures from a given base temperature, at a particular level of activation energy, the reaction proceeds more slowly (approaches one-to-one) than is predicted by the traditional approach. Moving in the opposite direction towards lower temperatures, the reaction proceeds faster than is predicted. Experimental results have been obtained which support this proposition.

A more detailed discussion of the inadequacies of these traditional approaches, along with graphical illustrations, may be found in an article entitled "Cure State Analysis" by Joseph R. Weber and Hector R. Espinal, published in Rubber Age, March 1968, pp. 55 through 65.

Thus, the foregoing may be summarized as follows:

1. Crosslinking is defined by measuring various physical properties. There exists some confusion and disagreement as to what to measure, how to measure, and where to measure.

2. Variation can exist at extreme levels in the testing procedures used to predict the physical property curve.

3. Rates of cure are determined by curing a compound at one fixed temperature and cure-conversion charts are extrapolated based on the assumption that the rate of reaction doubles for each 10° C. rise in temperature. Alternative studies of this concept state this is incorrect.

BRIEF SUMMARY OF THE INVENTION

It is an object of the present invention to provide a method whereby a true state of cure is related to the variable combinations of time and temperature which exist throughout the cure cycle of a vulcanizable compound.

It is another object of the present invention to provide a method whereby accurate indications of physical property development as well as a true state of cure are related to time and temperature variations throughout the cure cycle of a particular vulcanizable compound.

It is another object to provide a method whereby existing curing conditions for a particular compound may be optimized by relating a realistic state of cure to the temperature variations throughout the curing cycle of the compound.

The above objects and others apparent as this description proceeds are realized by curing samples of a particular compound at selected constant temperatures. During the cure of these samples, changes in shear modulus within each sample are measured. From these measurements are determined levels of cure for varying time and temperature combinations. A time-temperature-percent cure relationship is thereupon developed for the particular compound involved. From this relationship a true state of cure may be obtained for the time and temperatures involved during an actual curing cycle.

Also, from this same procedure a time-temperature-percent cure-shear modulus relationship may be developed. Using shear modulus as indicative of physical properties, a true state of cure and an indication of physical properties may be obtained from the time and temperatures involved during actual curing cycles.

DETAILED DESCRIPTION

Changes in the stiffness of a compound with time, as it cures at constant temperature, may be measured in testing devices generally known as curemeters. There are many such devices in use today. Basically, curemeters operate to apply a shear stress to a test specimen which is held under constant pressure in a uniformly and accurately heated cavity. Changes in shear modulus or stiffness caused by crosslinking reactions are continuously measured and recorded. The recording of these changes may be in the form of a graph or chart with shear modulus as the ordinate and time as the abscissa. The values of shear modulus are usually measured by the machine in unites of torque.

Figure 1:
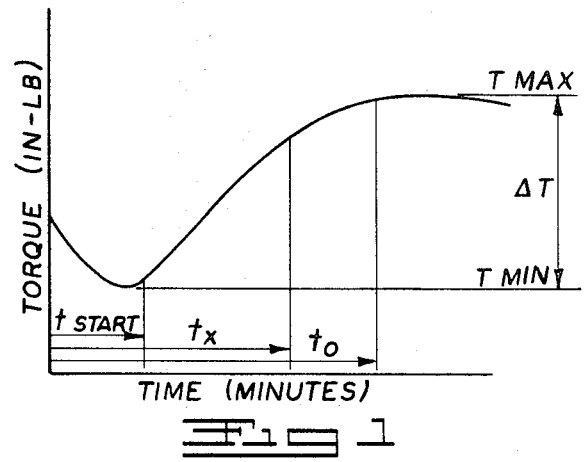
FIG. 1 shows a typical curemeter curve where variations in shear modulus are plotted with time.

FIG. 1 shows a typical graph of torque ($T$) vs. time ($t$) for a particular compound cured at constant temperature and pressure. At $t=0$ for this given temperature the specimen has an initial stiffness or torque $T_o$. As $t$ increases the stiffness or viscosity drops and the crosslink reaction begins. The torque reaches a minimum value $T$ min and begins to increase because the crosslinks are being formed more rapidly and begin to overcome the initial decrease in viscosity caused by the initial application of heat. The torque developed will then reach a maximum value $T$ max at time $t_o$. The portion of this curve between $T$ min and $T$ max can be interpreted as a percentage of crosslink or "percent conversion" at any time $t_x$ by the equation:

$$\text{Percent conversion:} \frac{T_x - T \text{ min.}}{T \text{ max.} - T \text{ min.}}$$

where $T$ min = lowest torque developed during the test cycle
$T$ max = highest torque developed during the test cycle
$T_x$ = torque value at time $t_x$ (the time required to reach the selected arbitrary percent conversion point)

Using information gathered from curemeter curves such as that shown in FIG. 1, a true state of cure may be determined for any time and temperature combination. To develop such a relationship it is necessary to obtain curemeter curves at a plurality of selected temperatures. A proper selection of temperatures might be in the range of 240° F. to 380° F. in 20° increments. A sample can be cured at each of the incremental temperatures and a series of curemeter curves similar to that in FIG. 1 obtained. Resubstitution of typical percent conversion values obtained in the first curemeter curve (e.g. FIG. 1) back into the above equation will result in certain time values for the particular temperatures represented by each curemeter curve.

For example, times may be found from each curve at a particular temperature to : start, 10, 20, 30, 40, 50, 60, 70, 80, 90 and 95 percent conversion.

Figure 2:
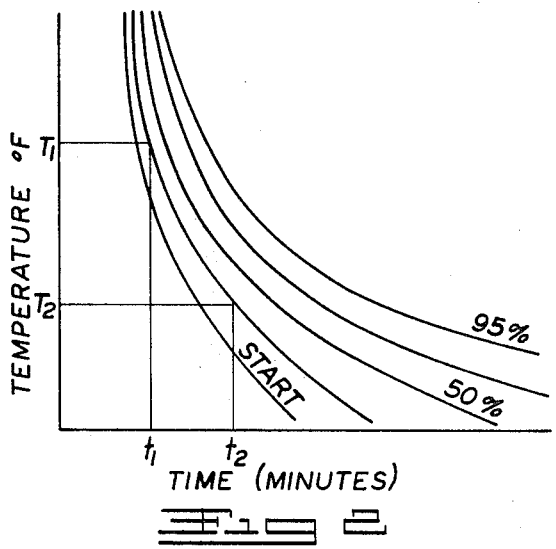
FIG. 2 shows a temperature-time-percent cure chart which was obtained according to the present invention.

Plotting these values with temperature as the ordinate, time as the abscissa and percent conversion as the projection of the Z axis onto a two dimensional plane, a time-temperature-percent conversion chart like that shown in FIG. 2 may be obtained.

Each curved line in FIG. 2 denotes equivalent percent conversion (state of cure) for various time and temperature relationships. For example, a temperature $T_1$ and time $t_1$ would be the equivalent of a temperature $T_2$ and time $t_2$ on a percent conversion basis.

While a chart such as FIG. 2 finds utility in the optimization of cure cycles it must be kept in mind that such a relationship is not absolute, since it does not take into account the state of physical property development relative to the three variables of time, temperature and percent conversion. Since maximization of physical properties depends on temperature, a true relationship would be a three-dimensional plot with time on the X-axis, percent conversion on the Y-axis, "physical properties" on the Z-axis and temperature as a projection of the fourth dimension on the other three. Such a relationship is nearly impossible since "physical properties" is not easily reducible to a single measurable variable.

A considerable amount of work has been done by industry in correlating the relationship of shear modulus, as measured by a curemeter, and 300 percent modulus. Reports have shown great similarity between the two to the point where variations in shear modulus with time, as a specimen cures in a curemeter, are taken as indications of variations in its physical properties. In other words, for a particular curing temperature, the point in time at which the maximum torque is reached is considered equivalent to the point in time at which the maximum physical properties for that temperature will be developed.

Figure 3:
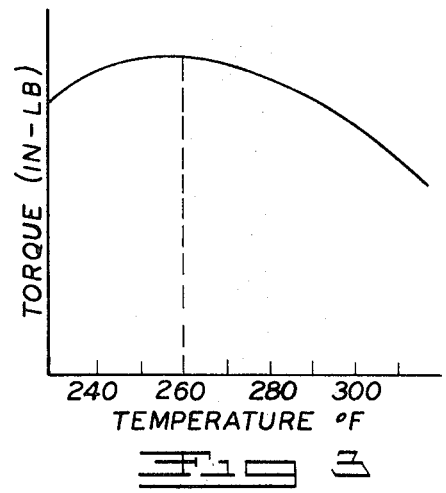
FIG. 3 is a chart depicting how maximum shear modulus varies with temperature.
Figure 4:
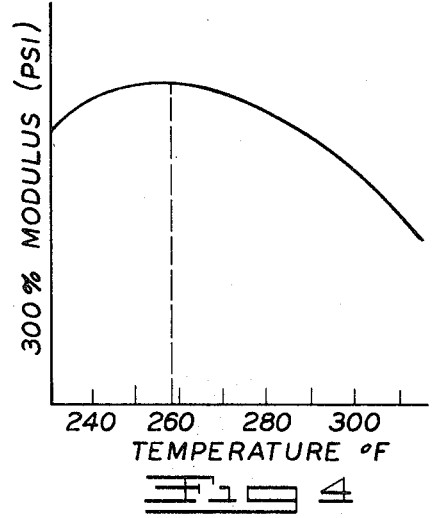
FIG. 4 is a chart similar to FIG. 3 depicting how maximum 300 percent modulus varies with temperature.

FIGS. 3 and 4 demonstrate this proposition. FIG. 3 shows a graph of the variations of maximum torques developed in curemeters for various curemeter temperatures. FIG. 4 shows maximum 300 percent modulus values as a function of temperature. The similarity between the curves is clear.

Returning then to the several curemeter curves from which is derived the time-temperature-percent conversion chart of FIG. 2, torque values may be used from these measurements to represent physical property data on the three dimensional plot suggested above. Therefore, a real relationship between time, temperature, state of cure and physical properties could be represented by the three-dimensional plot of FIG. 5 where time is plotted along the X-axis percent conversion (state of cure) on the Y-axis, torque on the Z-axis and temperature as a projection of the fourth dimension onto the other three.

In this relationship there would exist another of the missing variables not accounted for by the traditional approach to cure cycle analysis discussed previously; that of variation of physical properties as a function of temperature. This relationship needs to be accounted for whenever a cure cycle change is planned.

Figure 5:
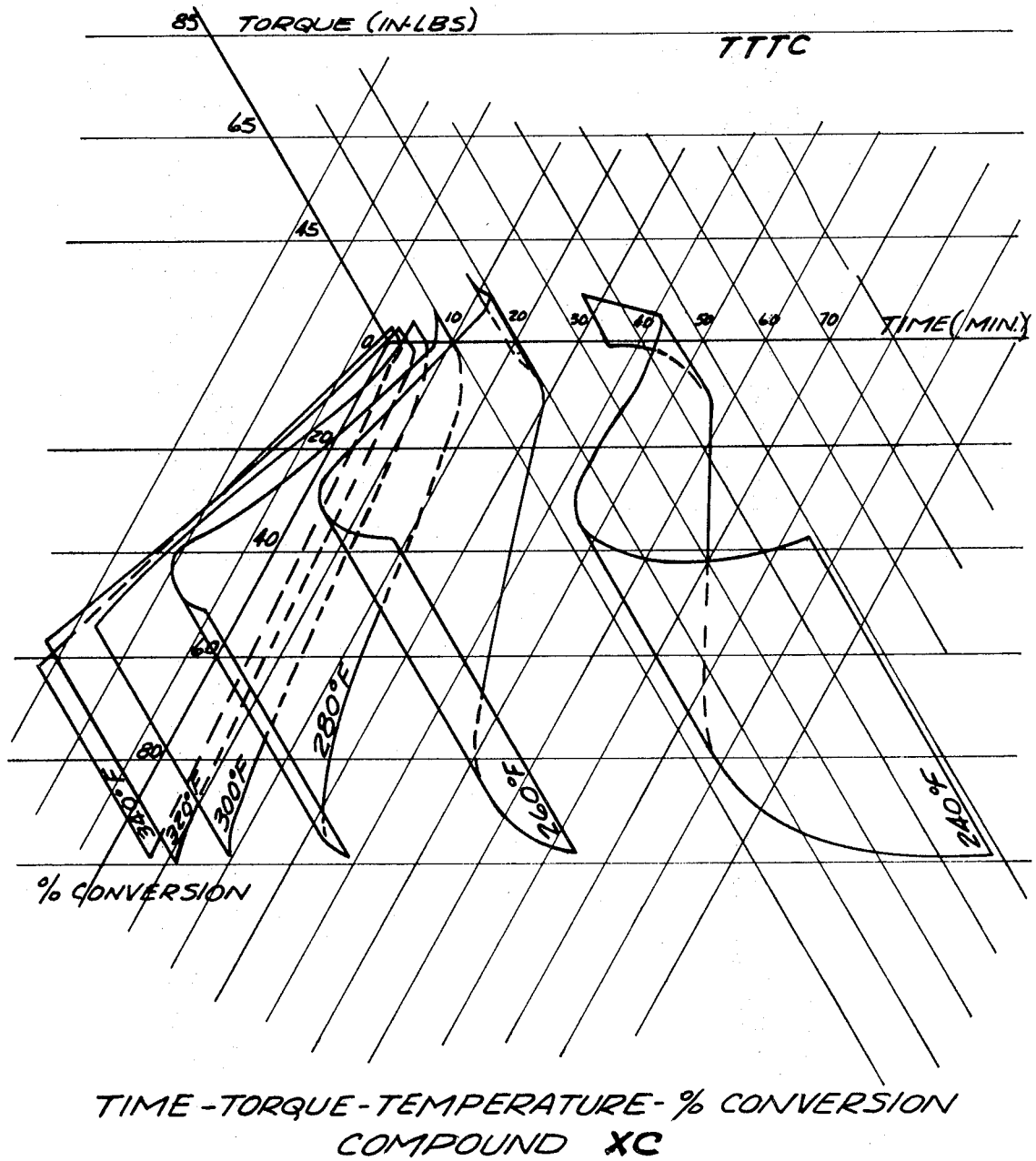
FIG. 5 is a three-dimensional chart showing time-shear modulus-percent cure response surfaces at representative curing temperatures.

As seen in FIG. 5, a three-dimensional "response surface" may be obtained for a particular compound at a particular temperature. A plurality of these response surfaces may be plotted in a single three-dimensional chart for a plurality of temperatures. When an actual cure cycle is planned for the particular compound in question, various time and temperature relationships may be obtained for a selected torque and state of cure. On the other hand, the chart in FIG. 5 may be used to determine the state of cure and shear modulus which has developed when the curing cycle has progressed for a certain time under certain temperatures.

For example, if it is known that a particular compound has undergone cure at 240° F. for 60 minutes, it may be determined that that compound has developed 17.5 percent of cure and approximately 42 "units" of torque. This determination is made by following along a line through the 60 minute point parallel to the Y-axis (percent conversion) until the bottom of the response surface at 240° F. is intersected. At this point of intersection, the percent conversion may be read from the Y-axis (e.g. 17.5 percent). For a measurement of torque, the height of the response surface must be measured from the same intersecting point at the bottom of the surface to the top, and that measurement "carried up" to the Z-axis to obtain a torque reading.

As stated, the time-temperature percent conversion chart of FIG. 2 finds utility in determining relative true states of cures for compounds to undergo cure. To demonstrate how the state of cure obtained by the method of the present invention deviate from the traditional or theoretical approach, attention is directed to the simplified time-temperature-percent conversion chart of FIG. 6.

Figure 6:
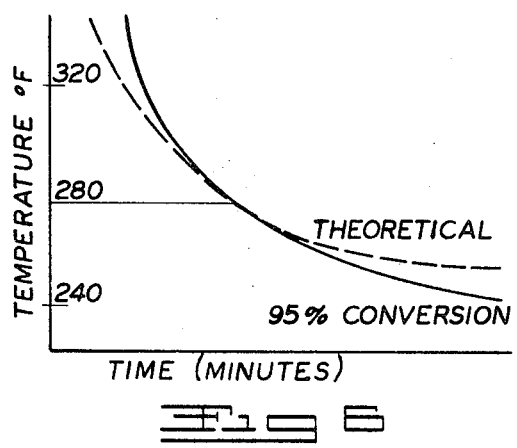
FIG. 6 is a graphical demonstration of how a 95 percent cure curve at varying time and temperatures obtained by the method of the instant invention will deviate from that obtained by traditional or theoretical methods.

In FIG. 6, only the 95 percent conversion curve 2 is shown as a function of time and temperature. The brokenline curve 4 represents the traditional or theoretical 95 percent conversion (i.e. where the reaction is said to double for each 18° F. rise in temperature). Using 280° F. and minutes to 95 percent conversion as a starting point, it is seen that the theoretical and actual rates are in agreement for approximately a 20° span of temperature. To the right of the chart (lower temperatures and longer times), the reaction proceeds faster than predicted by the theoretical. To the left on the chart of FIG. 6 (higher temperatures and shorter times) the reaction actually proceeds slower than predicted. If 95 percent conversion is considered as an optimum state of cure, this chart shows that products subjected to relatively low temperatures during a cure cycle will have a tendency to overcure rather than reach the selected theoretical optimum cure state of 95 percent. On the other hand, products which are subjected to relatively high temperatures during a cure cycle will tend towards undercure. In order to be precise for all compounds, a time-temperature-percent conversion chart for all compounds should be developed according to the method of the instant invention. It would, of course, be necessary to develop a time-temperature-percent conversion chart according to the invention for each distinct compound because each compound has its own unique reaction rate.

The percent conversion contours or curves as exemplified in FIG. 2 can be approximated mathematically. A plot of percent conversion temperature and time on semilog paper gives a straight line relationship for a temperature range of about 240° F. to about 320° F. for which the equation $T = m \log t + b$ can be derived. However, at higher temperatures drastic departures are observed. Although such a mathematical approach would be a better approximation than heretofore accomplished by tradition, it is nonetheless, an approximation. As stated previously, it is an object to use the method of this invention to determine actual or real values, rather than approximations, in analyzing cures.

From the foregoing, a definite advantage is seen in obtaining a time-temperature-percent conversion chart for a compound. Before obtaining a complete chart by the method previously described (analysis of curemeter curves for selected varying temperatures) there is an additional observation to be made.

As seen in FIG. 2, the first contour or curve line is denoted as "start" however, prior to arriving at the start of the crosslink reaction, it is necessary that a definite amount of heat be supplied to bring the compound to this start condition. The chart of FIG. 7 exemplifies a procedure whereby this hidden factor may be provided for.

Figure 7:
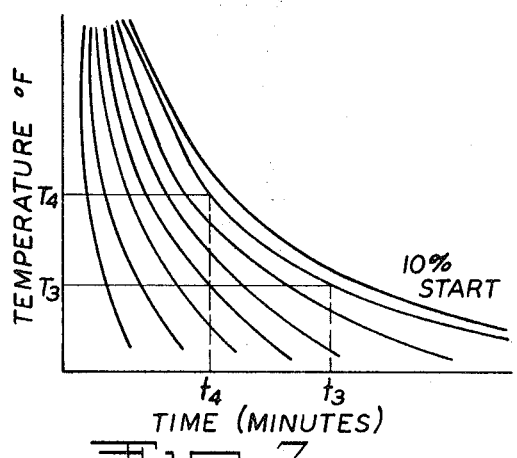
FIG. 7 is a temperature-time-percent cure chart similar to FIG. 2 but which illustrates the necessity of supplying heat for a period of time prior to the actual start of cure.

Referring to FIG. 7, it is noted that the heat input to a start condition may be read as a time at one temperature. For example, at T , this value of time would be $t_3$; while at $T_4$ the time value is $t_4$. If need be, several additional time intervals may be marked off on FIG. 7 to start condition at a particular temperature. The time intervals would then appear as a plurality of unequal lines mutually parallel to the X-axis. Each time interval may be divided into an equal number of increments, for example, 10. Each increment may then be joined to its counterpart at other temperatures and a family of equivalent cure curves for prestart conditions may be obtained, and a complete time-temperature-percent conversion chart like that shown in FIG. 8 may be obtained.

Figure 8:
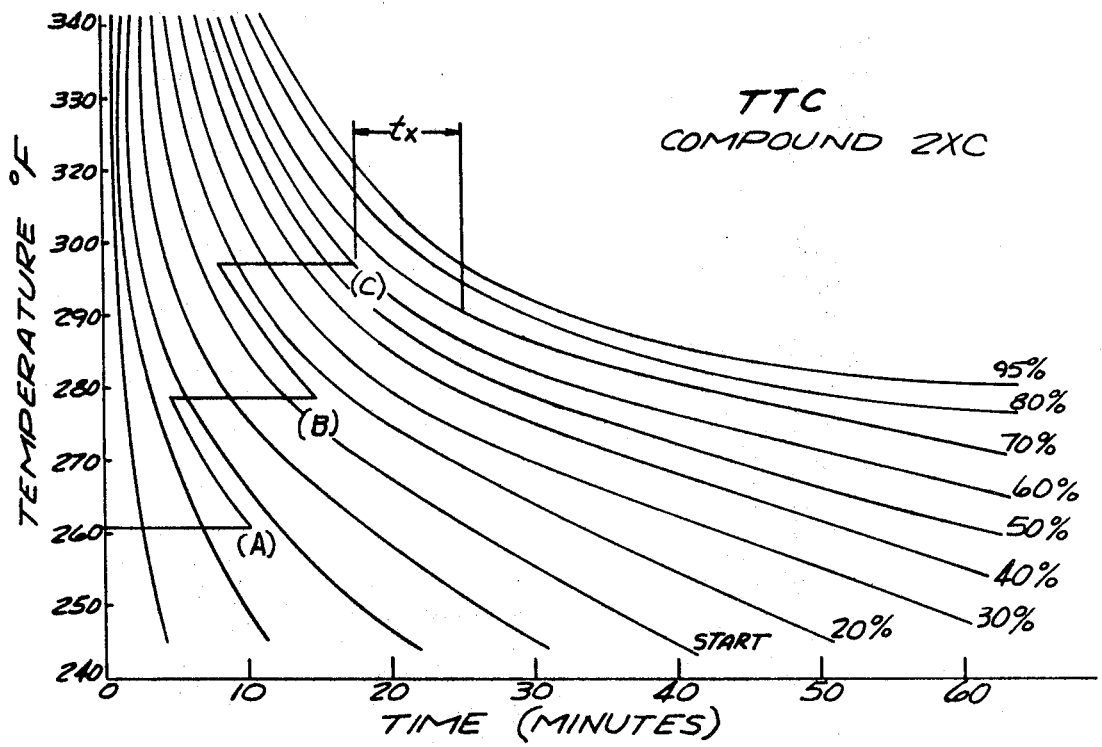
FIG. 8 is a time-temperature-percent cure chart exemplifying how a typical cure cycle may be analyzed.

The previous hypothetical example using equivalent minutes may be reanalyzed using the complete chart of FIG. 8. From the example, a stock had undergone the following cure:

10 minutes at 262° F.

10 minutes at 280° F.

10 minutes at 298° F.

Taking 95 percent conversion as optimum cure, it was found previously using the equivalent minutes that the stock had achieved 78 percent conversion.

The reanalysis, using a chart similar to FIG. 8, would proceed as follows.

First, the amount of cure is determined for 10 minutes at 262° F. (point A) then the equivalent value of cure is found at temperature 280° F. and continuing on the time axis for 10 minutes point B is determined. The process of determination is repeated until all temperature and time combinations are exhausted (point C). It is readily apparent that the compound for which the chart of FIG. 8 was derived (the same compound used in the "equivalent minutes" example) has undergone 60 percent cure. Using the equivalent minutes theory a 78 percent cure was calculated. To achieve 95 percent cure (selected optimum), it is seen the compound would need to be subjected to an additional $t_x$ minutes at 298° F. If an indication of physical property development was also desired, the above analysis could be made using the three-dimensional graph of FIG 5.

While the method cure analysis according to the present invention depends upon the charts exemplified by FIGS. 5 and 8, it is to be noted that the characteristics of these charts are based upon information derived from studies of curemeter curves. Without departing from the scope of the present invention other interesting analyses may be made in relation to cure cycles using curemeter curves described above.

Figure 9:
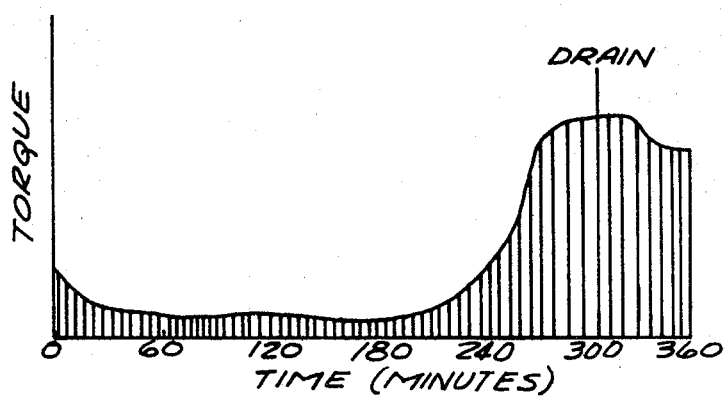
FIG. 9 is a curemeter plot simulating an actual curing cycle which shows that the cured compound will perform as designed.
Figure 10:
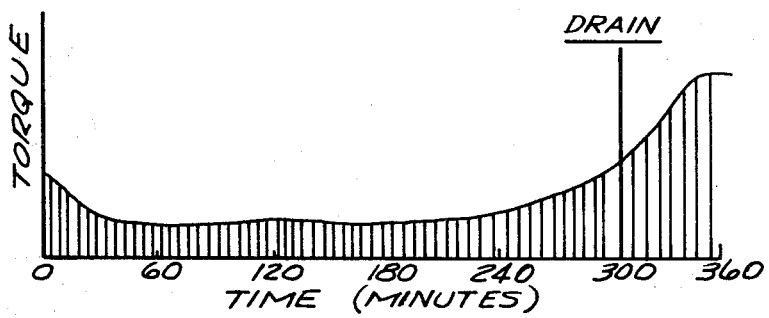
FIG. 10 shows a curemeter plot similar to FIG. 9 which shows an undercure condition.
Figure 11:
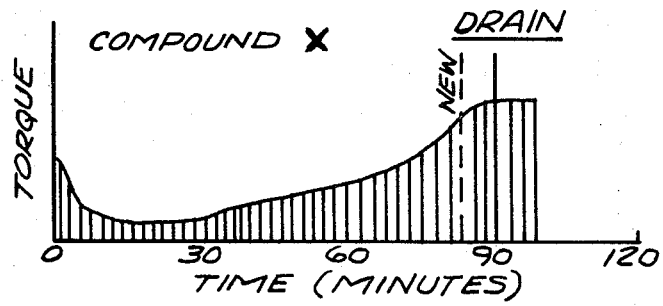
FIG. 11 is a chart showing how the simulation of an actual cure in a curemeter can result in the saving of actual cure time without affecting physical properties.

A curemeter test may be altered to simulate an actual curing cycle. FIGS. 9—11 exemplify this procedure. In such a simulation, samples of the same compounds which have undergone a known cure cycle are subjected to the same time and temperature relationships they encounter during the known cycle. FIGS. 9—11 are curemeter curves simulating existing cures for known compounds. Analyzing the curemeter curves as indications of physical property development, interesting and accurate observations may be made about the actual cure cycles under analysis. The line marked DRAIN in each of FIGS. 9—11 is that point at which pressure is released in the actual cure being simulated.

Analysis of the simulated cure of FIG. 9 would be that the compound will perform as predicted, since the drain point comes at the maximum physical property development (indicated by maximum torque value).

FIG. 10 indicates that during actual cure drain has occurred too early since the maximum physical property development has not occurred for that particular cure cycle.

Figure 12:
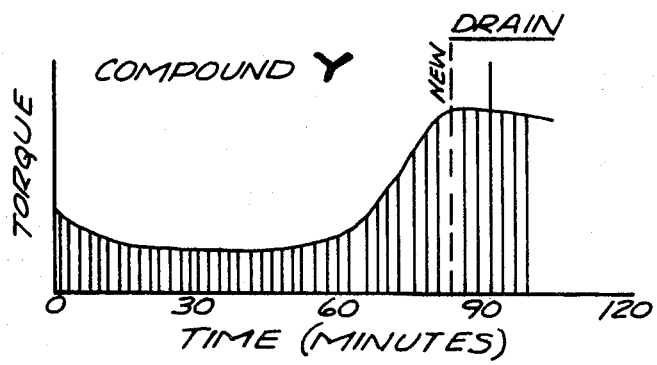
FIG. 12 is a chart similar to FIG. 11 for a different compound.

FIGS. 11 and 12 demonstrate that if drain were to occur at an earlier point in time, a substantial savings of press time would be realized without any significant loss in physical properties.

Other uses for this novel method of relating realistic states of cures and accurate indications of physical property development to time and temperatures variations have been discussed in the aforementioned article "Cure State Analysis" by J. R. Weber and H. R. Espinal, the named inventors in the instant application. These other uses are considered apparent from the foregoing. For a detailed discussion of these uses, attention is directed to this article, which is hereby incorporated by reference.

What we claim is:

1. Method of optimizing the cure of a vulcanizable compound which includes a curing cycle with variable temperature based upon accurate states of cure reached throughout said curing cycle, comprising the steps of
  A. preparing a plurality of uncured samples of said compound commensurate with a number of preselected incremental temperature values within the temperature range of said curing cycle
  B. curing each of said samples in a curemeter at a different one of said preselected temperature values, while simultaneously
  C. applying a rotary, oscillatory shear force to each sample,
  D. plotting shear modulus as a function of curing time for each of said samples,
  E. obtaining a set of states of cures from each of the plots resulting from step (D)
  F. plotting a range of states of cure for the compound as a function of time and temperature
  G. adjusting the time and/or temperature conditions of said curing cycle from the plot resulting from step (F) to optimize curing of said compound.

2. Method of optimizing the cure of a vulcanizable compound which includes a curing cycle with variable temperature, based upon accurate states of cure and physical properties developed throughout said curing cycle comprising the steps of
  A. preparing a plurality of uncured samples of said compound commensurate with a number of preselected incremental temperature values within the temperature range of said curing cycle
  B. curing each of said samples in a curemeter at a different one of said preselected temperature values, while simultaneously,
  C. applying a rotary, oscillatory shear force to each sample,
  D. plotting shear modulus as a function of curing time for each of said samples
  E. obtaining a set states of cures from each of the plots resulting from step (D)
  F. plotting three dimensional response surfaces for selected temperature values for the compound as a function of time, state of cure and shear modulus
  G. adjusting the time and/or temperatures of said curing cycle from the plot resulting from step (F) to optimize curing of said compound.